JOHN TINGLEY.

Improvement in Ice Cream Freezers.

No. 115,657.  Patented June 6, 1871.

2 Sheets--Sheet 2.

JOHN TINGLEY.
Improvement in Ice Cream Freezers.

No. 115,657.  Patented June 6, 1871.

Witnesses:
John P. Rogers
Chas. G. Blatchley

Inventor.
John Tingley 115,657

UNITED STATES PATENT OFFICE.

JOHN TINGLEY, OF PHILADELPHIA, PENNSYLVANIA.

IMPROVEMENT IN ICE-CREAM FREEZERS.

Specification forming part of Letters Patent No. 115,657, dated June 6, 1871.

*To all whom it may concern:*

Be it known that I, JOHN TINGLEY, of Philadelphia, Pennsylvania, have invented an Improved Ice-Cream Freezer; and I do hereby declare the following to be a full, clear, and exact description of the same.

My invention consists, firstly, of an ice-cream freezer, in which an outer vessel containing the ice and an inner vessel containing the cream, as well as the dasher within the latter, are revolved in a horizontal position separately and alternately, by attaching a crank first to the spindle of the dasher and revolving it rapidly, agitating the cream, while the outer vessel or tub containing the salt and ice is comparatively at rest, and secondly, by attaching the crank to the trunnion at the bottom of the tub, by which the tub, ice, and can are revolved rapidly, agitating all the contents, while the beater, with the scraper attached, is held stationary, thus enabling the operator to impart intense agitation either to the cream or to the freezing ingredients at the proper time to obtain the best results in both; and my invention consists, secondly, of a spring or elastic scraper, fully described hereinafter; and, third, my invention consists of a peculiarly constructed and located gum gasket, by which the can-lid is rendered perfectly tight, and which is hereinafter described.

Figure 1:
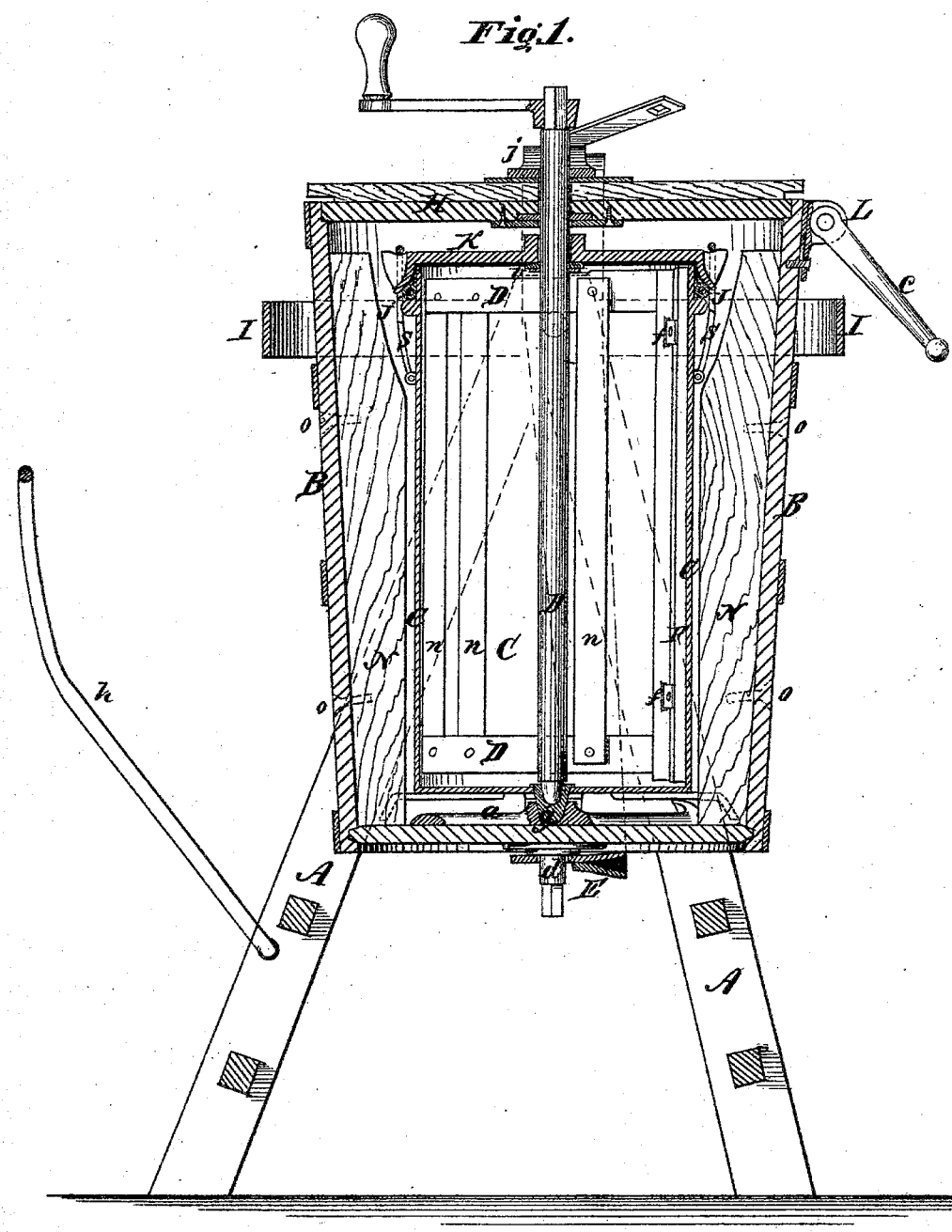
Figure 2:
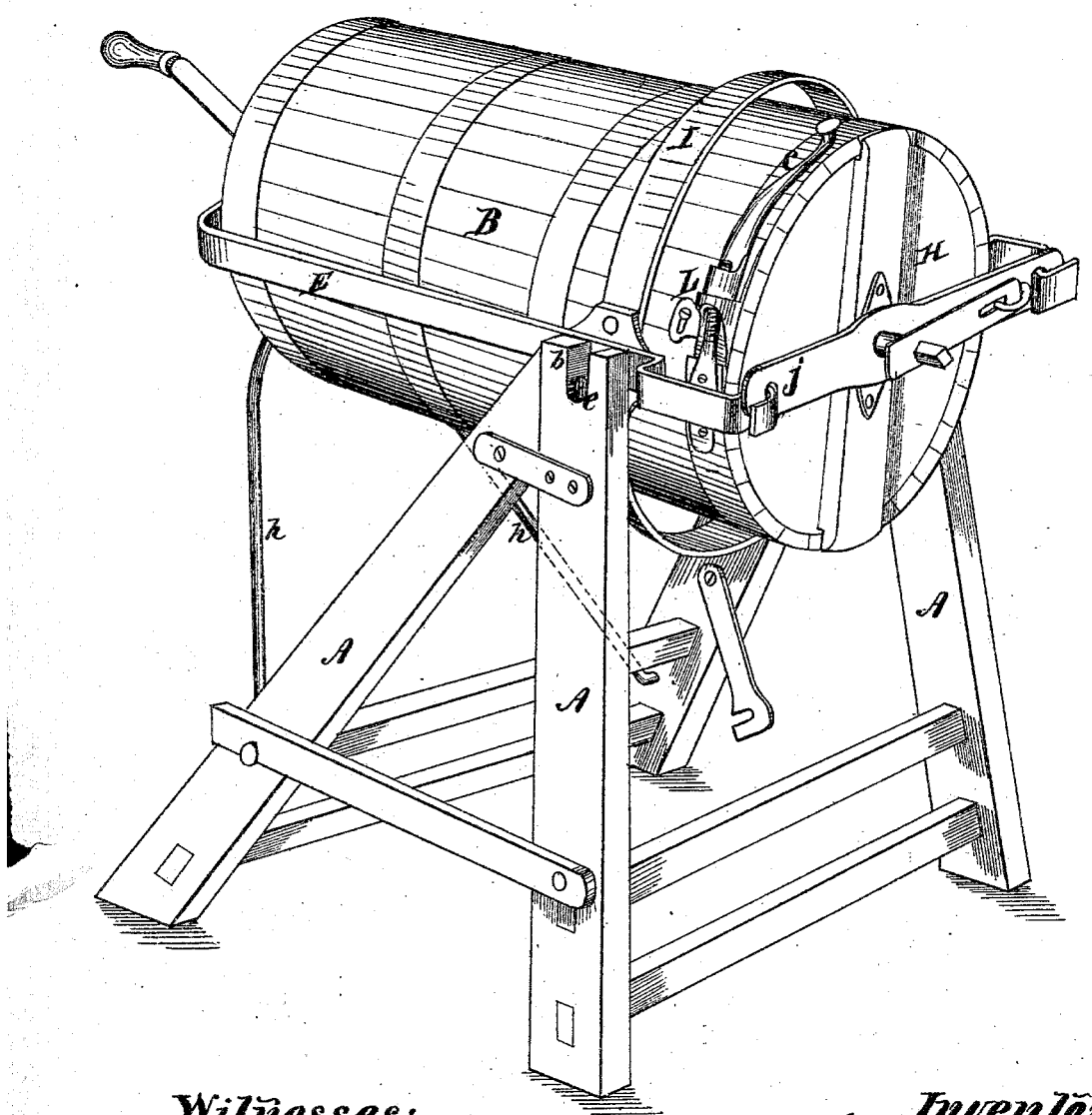

Figure 1 is a sectional elevation of my improved ice-cream freezer in its upright position. Fig. 2 is a perspective view in its horizontal position.

The frame A consists of four stands, girted together at the bottom, and meet at the top in the shape of the letter A, and are fastened together by iron plates and rivets so as to form a hinge by which the stand is folded up. (Seen in Figs. 1 and 2.) The tub B, containing the can C, is secured in its revolving position by the trunnion $d$ attached to the bottom and the spindle of the beater D, both of which rest upon bearings attached to the wrought-iron belt E, which passes round the tub lengthwise and rests upon the bearings $e\ e$, attached to it upon the sides, and upon the swinging brace $h$ at the bottom, Fig. 2. The tub B, while open, is held upright by the hoop I, which is larger in diameter than the tub and passes round it near the top, and is riveted to the base of the gudgeons $e\ e$. The side gudgeons rest in a scallop at the top of the junction of the stands $b\ b$. The cross-bar $j$ is connected by slots at each end to the attachment of the encircling-belt E, and has a hole in the center, through which the spindle of the beater passes, and becomes the axis of the large end or head of the tub, also of the can C. The vessel B is made in the ordinary style of cooperage except that it has a movable head, which is made water-tight, or let loose by the use of the contracting-band L. Within the vessel B is placed a smaller vessel, C, of tin or copper sheet, standing upon four feet, with a portion of the stipping-socket $g$ protruding through the bottom and extending nearly as low as the feet. In sitting in the can C the protruding socket enters a socket-hole in the hooked casting in $a$, which is fast to the bottom of the vessel B, so that by a slight turn of the can C the feet hook fast and prevent the can from rising or turning. The beater D is composed of a center spindle, with arms extending at right angles both ways, upon one side and center of which are riveted thin strips of iron, $n\ n\ n$. Upon the other side is attached the wooden scraper F, by inserting steel or brass springs through the slots in the arms and securing the wood to them by screws $ffff$. The can-lid is a casting with a flange projecting outward and downward, so that when placed upon the can C the flange comes in contact with the gum-gasket J resting on the stiffening wire passing round and near the top of the can. The lid K is pressed down and held by the loops $s\ s$, which are attached to the can C, and are slipped over the projections on the lid K. The gasket J is a small gum tube, having a hole of about one-sixteenth of an inch in diameter, through which a brass wire is passed. The gasket is then placed round the top of the can and the wire is twisted and soldered together, holding the gum firmly in its place. The passage of the spindle D through the lid K is prevented from leaking by the gasket $v$ resting on a collar attached to the spindle. The crank is fitted to the trunnion $d$ as well as to the spindle D. Inside the tub B are two thin pieces of wood, N N, attached to the tub by the screws $o\ o\ o\ o$, and exactly fill the space between the can C and the tub B, and serve as buckets to carry up the salt-water and ice.

While the tub B is in its upright position the cream is put into the can C, the lid K is then placed on the can, admitting the spindle D through a hole in the center, and is passed down and fastened by the loops $s\ s$, as above described. The space between the can and tub is then filled with ice containing salt. The head H of the tub B, which is strongly cleated, is then put in position, admitting the spindle D to pass through the bearing in the center. The lever $c$ of the contracting-band is then turned, drawing the head to a water-tight joint. The cross-bar $j$ is then put on, admitting the spindle D through the bearing in the center, and resting at each end in a niche on the cast extension of the belt E. The bottom of the tub B is then carried up to a horizontal position, swinging on the gudgeons $e\ e$, and is supported in that position by the brace $h$, which has a bearing under the trunnion $d$. The crank is placed first upon the beater and turned briskly for some minutes until the cream swells and thickens. The crank is then taken from the beater and an iron strap slipped on, which holds the beater stationary. While the crank is being shifted to the trunnion $d$ the tub and all its contents, except the beater, are made to revolve. The salt-water and ice are carried up by the buckets N N and thrown over the rolling can C. A very low degree of cold is thus obtained in the shortest possible time, and with great economy in material, time, and labor.

I claim as my invention, and desire to secure by Letters Patent—

1. The horizontally-revolving motion of the vessel B, in combination with the can C, the spindle D, the iron belt E with its attached bearings $e\ e$, the cross-bar $j$, the trunnion $d$, and the swinging brace $h$, by which the upright and horizontally-revolving positions are obtained.

2. The gasket J, in combination with the internal brass wire X, the lid K, and the loops $s\ s$.

In testimony whereof I have signed my name to this specification in the presence of two subscribing witnesses.

JOHN TINGLEY.

Witnesses:
  W. W. DOUGHERTY,
  P. H. NOLAN.